Jan. 12, 1943.　　　R. D. SCHNOOR　　　2,307,806
FILM HOLDER FOR MOTION PICTURE PROJECTORS
Filed Dec. 26, 1939　　　2 Sheets-Sheet 1

Inventor.
Raymond D. Schnoor

Jan. 12, 1943.　　　R. D. SCHNOOR　　　2,307,806
FILM HOLDER FOR MOTION PICTURE PROJECTORS
Filed Dec. 26, 1939　　　2 Sheets-Sheet 2
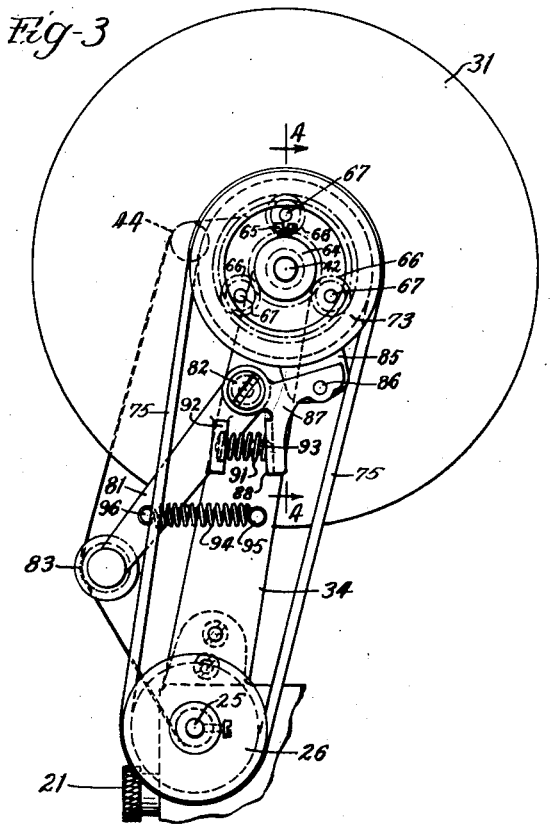
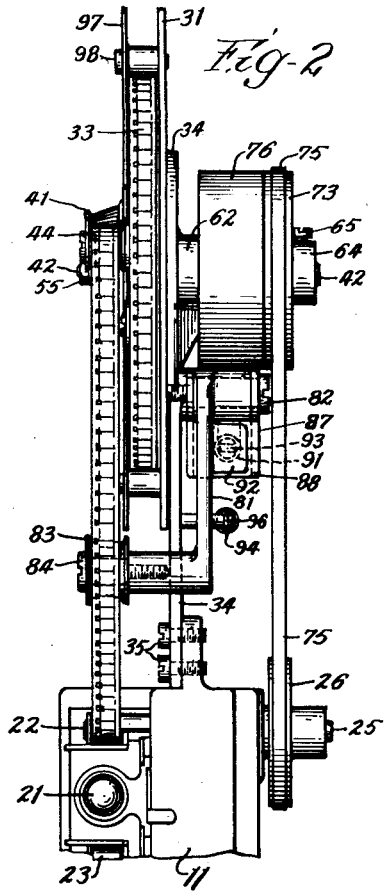
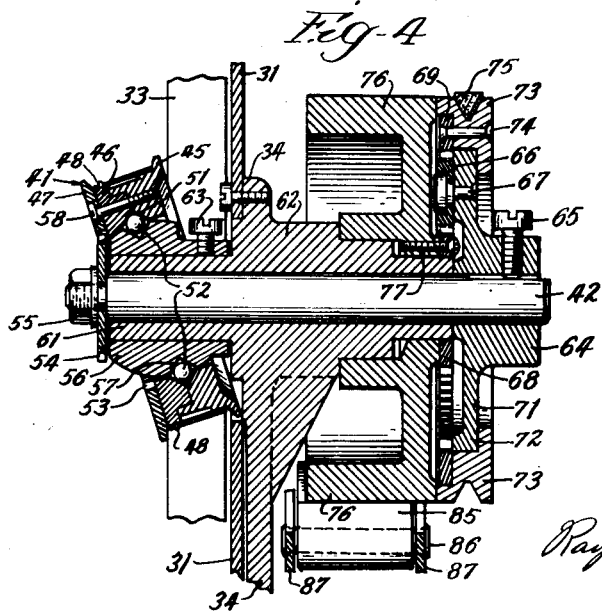
Inventor.
Raymond D. Schnoor Patented Jan. 12, 1943

2,307,806

UNITED STATES PATENT OFFICE 2,307,806

FILM HOLDER FOR MOTION PICTURE PROJECTORS

Raymond D. Schnoor, Chicago, Ill., assignor to Mills Novelty Company, Chicago, Ill., a corporation of Illinois Application December 26, 1939, Serial No. 310,991

13 Claims. (Cl. 88—18.7)

This invention relates in general to a film holder for motion picture projectors and more particularly to a film holder and feed mechanism for use with continuous or endless film projectors.

An important object of the invention is to provide such a drive which will draw or feed film from a coil to an outside loop in accordance with the rate of travel of the film of the outside loop through a projector regardless of whether or not the device and the projector are driven from a common power source or variations may occur as an incident to power transmission.

A further object of the invention is to provide a smooth and yielding film feeding mechanism which by its action will reduce the possibility of film breakage during operation by modifying and distributing high stress points such as may occur when the sum total of the frictional engagement of the several convolutions of the film coil act to resist the unwinding or draw-out pull.

Another object is to provide such a device which is variable in accordance with operating conditions as indicated by conditions existing in the outside loop, such as an increase or a decrease in the size thereof.

A further object of the invention is to provide a variable feed or film winding and unwinding mechanism which positively engages the film and does not slip with respect thereto in such a manner as to have an abrasive effect upon the film such as may impair reproduction therefrom.

Other objects and advantages will be apparent as the invention is better understood from the following description, which, taken in connection with the accompanying drawings, discloses an embodiment thereof.

Referring to the drawings:

Fig. 2 is a front elevational view, viewing the apparatus shown in Fig. 1 from the right and showing only the top portion of the projector.

Fig. 3 is an elevational view showing the side of the apparatus opposite that shown in Fig. 1, or as viewed from the right in Fig. 2; and, Fig. 4 is a sectional view taken substantially on line 4—4 in Fig. 3 and illustrating details of construction of the film actuating mechanism.

Figure 1:
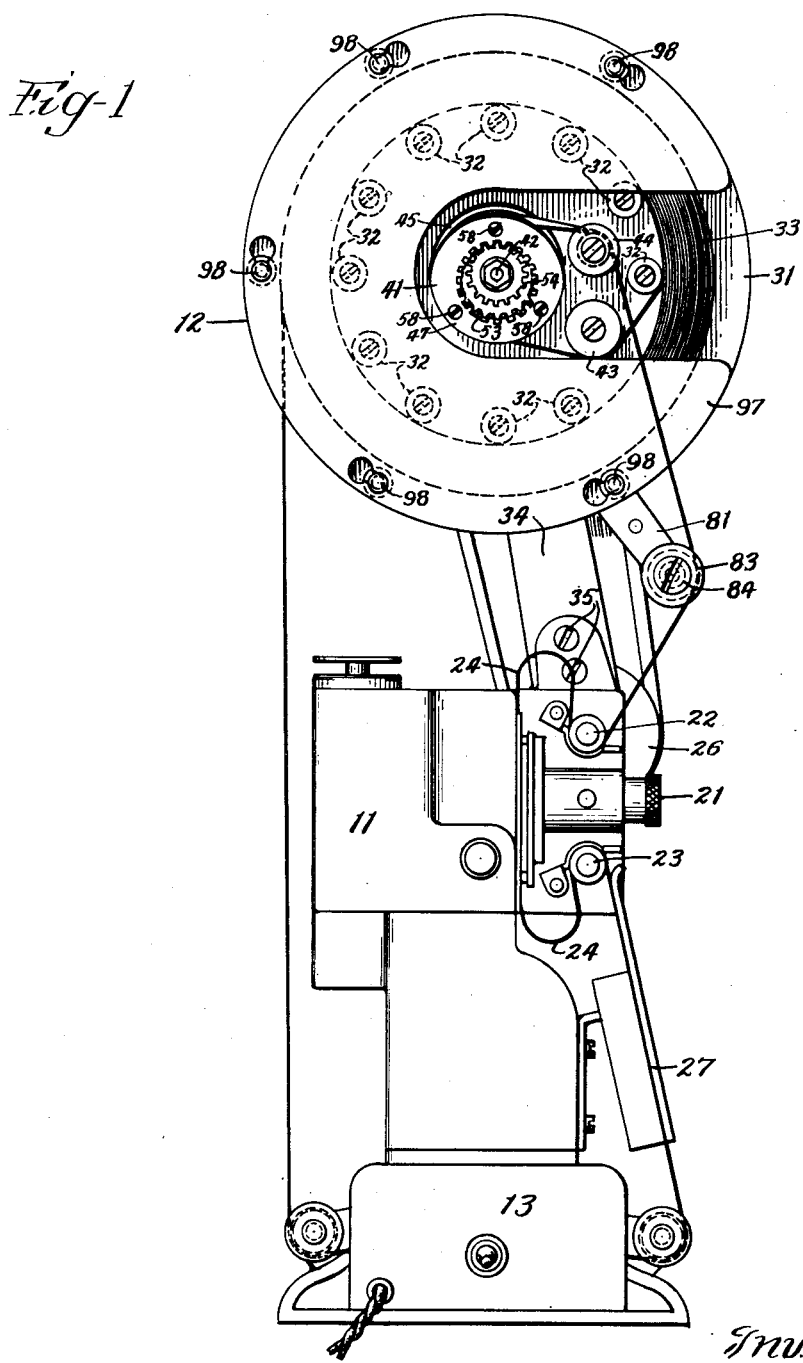
Figure 1 is an elevational view of a conventional projector for motion pictures, equipped with apparatus embodying my invention.

To illustrate the invention I have shown a projector 11 carrying a film holder 12 equipped with a sound reproducing mechanism 13.

The projector 11 illustrated is a conventional type of motion picture projector and may be any familiar or commercial type of projector equipped with an optical projection system including a lens 21 and a film feed mechanism for advancing the film across the optical system for projection and including feed sprockets 22 and 23 arranged above and below the optical system for maintaining a film loop 24 suitable for an intermittent feed mechanism by means of which the film is moved across the optical system for projection. Power means (not shown) is inclosed with and forms a part of the projector and is connected through transmission devices for actuating the feed sprockets 22 and 23 and a drive shaft 25 extending from the projector opposite the sprocket 22 to receive a pulley 26 or a similar device for rotating film reel spindles or the like.

Similarly the sound reproducing mechanism 13 may be any standard or commercial device suitable for the purpose and an automatic switch 27 may be provided for stopping the projector in the event of film breakage upon occasion.

To form the film carrier 12 I have shown a frame plate 31 upon which a series of anti-friction rollers 32 are mounted in circular order so as to form a circular anti-friction holder for a film coil 33.

The frame plate 31 is directly secured to and carried by a support arm 34 which is secured to the top of the projector 11 by means of screws 35, Figs. 1 and 2.

The ends of the film of the coil 33 are connected together and form an outside loop of film which is laced from the innermost convolution of the coil to move through the projector as above described, through the switch 27 and sound reproducing mechanism 13, and then back to the periphery of the film coil 33.

In accordance with this invention means is provided for varying the speed of the film unwinding action in accordance with operating conditions and for controlling such variations in accordance with conditions existing in the above-mentioned outside loop of film and further for accomplishing this while maintaining a constant or non-slip engagement with the film.

To accomplish this a payout sprocket 41 is mounted near the face of the frame plate 31 within the film coil 33 and for rotation by means of an operating shaft 42. A guide roller 43 mounted near the face of the frame plate 31 guides the film from the innermost convolution of the coil 33 to the sprocket 41, and a similar guide roller 44, mounted away from the face of the plate 31 in accordance with the lateral displacement of the film required for crossing as indicated, guides the film from the sprocket 41 at the beginning of the outside film loop.

The sprocket 41 is an assembly of three annular parts: A part 45 forming a shoulder for carrying one edge of the film and a peripheral edge flange forming a film guide as shown in Fig. 4, a part 46 registering with the part 45 and forming a film carrying shoulder for the other edge of the film, and a part 47 forming a peripheral edge flange adjacent the shoulder formed on the part 46 for guiding film. Suitable sprocket teeth 48 may be formed on the shoulders of both of the parts 45 and 46 pitched to correspond with the perforations in the film to be used and where film having sound recordings thereon is to be used the sprocket teeth may be omitted on the shoulder of one of the parts, such as the part 45.

A ball race 51 is formed in the inner surfaces of the annular parts 45 and 46 upon assembly for receiving bearing balls 52 upon which the sprocket may be rotated and internal gear teeth 53 are formed in the inner surface of the annulus forming the part 47 for meshing with a spur gear 54 secured to rotate with the shaft 42 by means of a nut 55 having threaded engagement with a reduced end portion of the shaft.

The parts 45, 46 and 47 of the sprocket 41 are assembled over a hub 56 and the bearing balls 52 arranged in a ball race 57 formed in the periphery thereof and are secured in assembled relationship by means of screws 58 or the like as shown in Figs. 1 and 4.

In order to shift the film laterally as an incident to the movement thereof about the sprocket 41 or out of the plane of the film coil 33 and into the plane of the outside loop of film the sprocket 41 is mounted to rotate about an axis which is correspondingly out of register with the axis of the shaft 42 or disposed at an angle thereto in accordance with the diameter of the sprocket 41 and the ball race 57 with determines the plane of rotation of the sprocket 41 is formed in the periphery of the hub 56 accordingly.

The hub 56 is held stationary during operation and therefore should be mounted on a fixed part such as a bearing 61 of tubular form extending from a main bearing 62 formed at the top of the support arm 34. The hub 56 is bored to fit over the bearing 61 so as to permit radial adjustment upon occasion and is secured in operative relationship by means of a set screw 63 having threaded engagement in the hub and engaging the bearing 61.

A driving hub 64 is secured to the shaft 42 by means of a set screw 65 or the like and cooperates with the gear 54 to register the shaft 42 longitudinally. At least one and preferably three spur gear pinions 66 are mounted in radially spaced relationship, at a suitable distance from the axis of the hub 64, and to rotate upon shoulder studs 67 carried by the hub. A ring gear 68 and an internal gear 69 cooperate with the pinions 66 to form a planetary or differential transmission through which the shaft 42 is driven.

A web 71 formed about the hub 64 provides support for the studs 67 and terminates in an annular rim 72, and a grooved pulley 73 is mounted to rotate upon this rim, the rim being embraced between the pulley and one face of the internal gear 69 which is secured to the pulley by means of rivets 74 or the like.

The pulley 73 is continuously rotated during operation from a suitable power source such as the projector and to provide this power connection I have shown a belt 75 engaged with the pulley 73 and with the pulley 26 carried by the shaft 25 of the projector.

The pulleys 73 and 26 are proportioned so that the hub 64 and shaft 42 will be driven to effect a slight overdrive when the ring gear 68 is held stationary or so that the sprocket 41 will be driven to pay out film somewhat faster than it is passing through the projector at the instant and this overdrive is modified or eliminated by permitting the ring gear 68 to rotate.

The ring gear 68 is secured for rotation with a brake wheel 76 by means of screws 77 or the like and the brake wheel 76 is rotatably mounted on the bearing 62 formed on the bracket 34.

To provide means for controlling the action of the differential mechanism above described in accordance with conditions existing in the outside film loop, such as an oversize or undersize condition due to over or underdrive or other causes, I have shown an arm 81 pivotally mounted on a shoulder stud 82, and formed to carry a roller 83 in position to engage the film of the outside loop preferably between the guide roller 44 and the feed sprocket 22 of the projector 11. The roller 83 may be flanged and is mounted to rotate freely upon a shoulder stud 84 having threaded engagement in the arm 81 and the shoulder stud 82 is threaded into or otherwise rigidly secured to the support arm 34 near the brake wheel 76 and at a point where an increase or a decrease in the size of the outside film loop will effect pivotal movement of the arm 81.

A brake shoe 85 is arranged to be pressed against the periphery of the brake wheel 76 to retard or prevent rotation thereof as above described and while this shoe may be carried directly by the arm 81 it is preferable to mount the shoe to permit a rocking action so that the working surface thereof will be equalized in accordance with wear. Accordingly the shoe 85 is supported on a pin 86 extending transversely through the shoe and carried in a yoke 87. The yoke 87 is formed by spaced side plates embracing the shoe 85 and having bearings on the stud 82 similarly embracing the arm 81, and a connecting plate 88 extending between the arms.

A compression spring 91 may be mounted between the connecting plate 88 of the yoke 87 and a laterally extending lug 92 formed on the arm 81 to yieldingly connect the shoe 85 with the arm 81 whereby the arm is permitted to move about its pivot while only the pressure applied to the shoe varies, thus permitting an increase or decrease in the size of the outside film loop throughout a predetermined range and consequently reducing the tendency toward film breakage. The spring 91 may be seated in a suitable pocket formed in the lug 92 and similarly registered with respect to the yoke 87 such as by means of a locating finger 93 extending from the crossplate 88 and into the spring.

In order to reduce strain on the film of the outside loop the arm 81 and consequently the brake shoe 85 is preloaded so that with the application of only a mild pressure to the roller 83, carried by the arm 81, the brake wheel 76 may be completely stopped. This may be accomplished by a tension spring 94 engaged with a pin 95 mounted on the support arm 34 and a similar pin 96 mounted in the arm 81.

The coil of film 33 may be removed from the film holder 12 to permit of the substitution of another film therefor by disengaging the outside film loop from the projector 11 and from the sound reproducing mechanism 13, and then removing a cover plate 97 carried by spacer studs 98 mounted near the periphery of the frame plate 31 and having a bayonet connection with the plate 97.

The sprocket 41 and the feed sprockets 22 and 23 are normally driven at the same peripheral speed so that an equal footage of film will pass to and from both during the same time period but when an excess strain on the film of the innermost convolution of the coil 33 occurs the brake wheel 76 is permitted to slip as a safety factor or to prevent film breakage. This slippage of the drive obviously results in a lag in the film feed and a consequent reduction in the size of the outside loop to which the arm 81 responds to apply more pressure to the brake shoe 85. Pressure applied to the shoe 85 retards rotation of the brake wheel 76 until the overdrive thus effected brings the outside film loop back to normal size.

It is thought that the invention and many of its attendant advantages will be understood from the foregoing description, and it will be apparent that various changes may be made in the form, construction, and arrangement of the parts without departing from the spirit and scope of the invention, or sacrificing all of its material advantages, the form hereinbefore described being merely a preferred embodiment thereof.

What I claim and desire to secure by Letters Patent is:

1. A power operable film actuating mechanism for association with film holders of the type adapted for holding annular coils of film and for winding and unwinding film from the annular coil in accordance with the requirements of a projector comprising, an operating shaft rotatably mounted adjacent the film coil and provided with driving elements whereby the shaft may be actuated from a power source, film drive means mounted to rotate about the operating shaft on an axis disposed at an angle to the axis of said shaft and carrying an internal gear, and means forming a drive connection between said shaft and the film drive means including the internal gear carried thereby and a companion gear carried by the shaft.

2. A power operable film actuating mechanism for association with film holders of the type adapted for holding annular coils of film and for winding and unwinding film from the annular coil in accordance with the requirements of a projector comprising, an operating shaft rotatably mounted adjacent the film coil and provided with driving elements whereby the shaft may be actuated from a power source, a hub surrounding the operating shaft at one end thereof and adapted to be fixed in adjusted relationship, said hub having a ball race formed in the periphery thereof on an axis crossing that of the operating shaft, film drive means having an internal ball race and adapted to rotate on bearing balls arranged in the ball race of said hub, and means forming a drive connection between the film drive means and said operating shaft whereby the film drive means may be rotated.

3. A power operable film actuating mechanism for association with film holders of the type adapted for holding annular coils of film and for winding and unwinding film from the annular coil in accordance with the requirements of a projector comprising, an operating shaft rotatably mounted adjacent the film coil and being connected to effect winding and unwinding of the convolutions of the annular film coil, and transmission means whereby the operating shaft may be actuated from a power source including a hub secured to the operating shaft and carrying planetary gears, a pulley mounted for rotation about said hub and carrying an internal gear in mesh with the planetary gears, and a spur gear centrally mounted with respect to the planetary gears and arranged to be restricted with respect to its movement whereby the planetary gears are caused to follow the pulley and effect corresponding rotary movement of the operating shaft.

4. A power operable film actuating mechanism for association with film holders of the type adapted for holding annular coils of film and for winding and unwinding film from the annular coil in accordance with the requirements of a projector comprising, an operating shaft rotatably mounted adjacent the film coil and being connected to effect winding and unwinding of the convolutions of the annular film coil, and transmission means whereby the operating shaft may be actuated from a power source including a hub secured to the operating shaft and carrying planetary gears, a pulley mounted for rotation about said hub and carrying an internal gear in mesh with the planetary gears, and a spur gear centrally mounted with respect to the planetary gears and associated with a friction brake means whereby movement of the spur gear may be restricted to effect corresponding movement of the planetary gears in response to rotation of the pulley.

5. For association with an endless film attachment for motion picture projectors of the type wherein an endless coil of film is supported for rotation adjacent a projector with a portion of the film arranged to form an outside loop adapted to be threaded through and about the projector, a support for said attachment, and power actuated mechanical means attached to said support and being operable to engage said loop and effect unwinding of the film coil by drawing out the innermost of the convolutions thereof, said mechanical means including a power escapement mechanism and a friction drag control means coordinated therewith and controlled by the film of the outside loop for regulating film unwinding action in accordance with conditions of the outside loop caused by operation of the projector.

6. For association with an endless film attachment for motion picture projectors of the type wherein an endless coil of film is supported for rotation adjacent a projector with a portion of the film arranged to form an outside loop adapted to be threaded through and about the projector, a support for said attachment, and power actuated mechanical means attached to said support and being operable to engage and effect unwinding of the film coil by drawing out the innermost of the convolutions thereof, said mechanical means including a rotatable element arranged for connection in transmission relationship with a uniform power source, a film engaging element arranged to engage the film, and an interposed differential transmission device arranged for control by means of the film of the outside loop whereby operation of said mechanical means is controlled in accordance with operating conditions of the outside loop.

7. For association with an endless film attachment for motion picture projectors of the type wherein an endless coil of film is supported for rotation adjacent a projector with a portion of the film arranged to form an outside loop adapted to be threaded through and about the projector, a support for said attachment, and power actuated mechanical means attached to said support and being operable to engage and effect unwinding of the film coil by drawing out the innermost of the convolutions thereof, said mechanical means including a rotatable element arranged for connection in transmission relationship with a uniform power source, a film engaging element arranged to engage the film, a friction brake controlled differential transmission device interposed between and operably connecting the rotatable element and the film engaging element, and brake control means including an arm arranged to engage the film of the outside loop for controlling action of the differential transmission device in accordance with conditions thereof whereby operation of said mechanical means is controlled in accordance with operating conditions of the outside loop.

8. A power operable film actuating mechanism for association with film holders of the type adapted for holding annular coils of film and for winding and unwinding film to and from the annular coil in accordance with the requirements of a projector, comprising an axially registered operating shaft rotatably mounted adjacent the film coil and provided with at least one driving element whereby the shaft may be actuated from a power source, separately mounted film drive means mounted in register with and to rotate about the operating shaft on an axis disposed at an angle to the axis of said shaft, said film drive means being arranged to engage the film from the innermost convolution of said coil and direct the same into a different plane from that in which the coil is located, and means forming a drive connection between said shaft and the film drive means.

9. For association with a film holder and film coil for endless film projectors of the type wherein a coil of film is supported for rotation adjacent a projector and the ends of which are connected together forming an outside loop adapted to be threaded through and about the projector, a power operable drive element arranged to engage said loop of film near the coil but after separation of the loop therefrom to effect unwinding action of the film coil by drawing out of the innermost of the convolutions thereof and directing the same at an angle into said outside loop, transmission means arranged for connection to a uniform power source, a brake-controlled drive reducing gearing operably connecting said drive element and said transmission means, and means engaging the film of the outside loop for controlling brake action whereby the winding and unwinding action is determined by variations in the size of the outside loop.

10. For association with a film holder and film coil for endless film projectors of the type wherein a coil of film is supported for rotation adjacent a projector and the ends of which are connected together forming an outside loop adapted to be threaded through and about the projector, a power operable drive element arranged to engage said loop of film near the coil but after separation of the loop therefrom to effect unwinding action of the film coil by drawing out of the innermost of the convolutions thereof and directing the same at an angle into said outside loop, transmission means arranged for connection to a uniform power source, drive reducing gearing operably connecting said drive element and said transmission means whereby the action of the drive element may be modified including a brake element, and a brake actuating arm arranged to adjust the brake element in accordance with variations in the size of the outside loop.

11. For association with a film holder and film coil for endless film projectors of the type wherein a coil of film is supported for rotation adjacent a projector and the ends of which are connected together forming an outside loop adapted to be threaded through and about the projector, a power operable drive element arranged to engage said loop of film near the coil but after separation of the loop therefrom to effect winding and unwinding action of the film coil, transmission means arranged for connection to a uniform power source, drive reducing means operably connecting said drive element and said transmission means whereby the action of the drive element may be modified including a brake element, a brake actuating arm arranged to adjust the brake element in accordance with variations in the size of the outside loop, and means forming a yielding connection between the brake element and said brake actuating arm whereby a lag in operation is permitted to eliminate excess stresses on the film of the outside loop.

12. For association with a film holder and film coil for endless film projectors of the type wherein a coil of film is supported for rotation adjacent a projector and the ends of which are connected together forming an outside loop adapted to be threaded through and above the projector, a power operable drive element arranged to engage said loop of film near the coil but after separation of the loop therefrom to effect winding and unwinding action of the film coil, transmission means arranged for connection to a uniform power source, drive reducing means operably connecting said drive element and said transmission means whereby the action of the drive element may be modified including a brake element, a brake actuating arm arranged to adjust the brake element in accordance with variations in the size of the outside loop, and means for preloading said brake actuating arm to reduce the normal operating strain on the film of the outside loop.

13. For association with a film holder and film coil for endless film projectors of the type wherein a coil of film is supported for rotation adjacent a projector and the ends of which are connected together forming an outside loop adapted to be threaded through and about the projector, a power operable drive element arranged to engage said loop of film near the coil but after separation of the loop therefrom to effect winding and unwinding action of the film coil, transmission means arranged for connection to a uniform power source, drive reducing means operably connecting said drive element and said transmission means whereby the action of the drive element may be modified including a brake element, a brake actuating arm arranged to adjust the brake element in accordance with variations in the size of the outside loop, means forming a yielding connection between the brake element and said brake actuating arm whereby a lag in operation is permitted to eliminate excess stresses on the film of the outside loop, and means for preloading said brake actuating arm to reduce the normal operating strain on the film of the outside loop.

RAYMOND D. SCHNOOR.